United States Patent
Ko et al.

(10) Patent No.: US 8,380,135 B2
(45) Date of Patent: Feb. 19, 2013

(54) METHOD OF TRANSMITTING CONTROL INFORMATION IN WIRELESS COMMUNICATION SYSTEM

(75) Inventors: Hyunsoo Ko, Gyeongki-do (KR); Jae Hoon Chung, Gyeongki-do (KR); Seunghee Han, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 12/773,448

(22) Filed: May 4, 2010

(65) Prior Publication Data

US 2010/0279625 A1 Nov. 4, 2010

Related U.S. Application Data

(60) Provisional application No. 61/175,455, filed on May 4, 2009.

(30) Foreign Application Priority Data

Dec. 8, 2009 (KR) .................. 10-2009-0121179

(51) Int. Cl.
*H04B 1/00* (2006.01)
*H04B 7/00* (2006.01)

(52) U.S. Cl. ............ 455/68; 455/67.11; 455/550.1
(58) Field of Classification Search ........... 455/67.11, 455/68, 550.1, 562.1, 575.7
See application file for complete search history.

(56) References Cited

U.S. PATENT DOCUMENTS

| | | | | |
|---|---|---|---|---|
| 5,457,465 | A  | * | 10/1995 | Collier et al. ............... 342/374 |
| 7,058,363 | B2 | * | 6/2006  | Hottinen et al. ............ 455/69 |
| 8,208,363 | B2 | * | 6/2012  | Kishiyama et al. ......... 370/204 |

* cited by examiner

*Primary Examiner* — Tuan H Nguyen
(74) *Attorney, Agent, or Firm* — Morgan, Lewis & Bockius LLP

(57) ABSTRACT

A method of transmitting data in a wireless communication system is provided. A user equipment receives an antenna group selection indicator indicating an antenna group comprising two or more activated transmit antennas among a plurality of transmit antennas, selects a transmit antenna to be activated according to the antenna group selection indicator, and transmits the data by supplying power to a power amplifier corresponding to the selected transmit antenna, wherein the number of power amplifiers is less than the number of transmit antennas and a type of the antenna group is determined according to the number of the power amplifiers. Accordingly, information on an antenna group in use among a plurality of antennas can be effectively transmitted.

12 Claims, 13 Drawing Sheets

FIG. 12
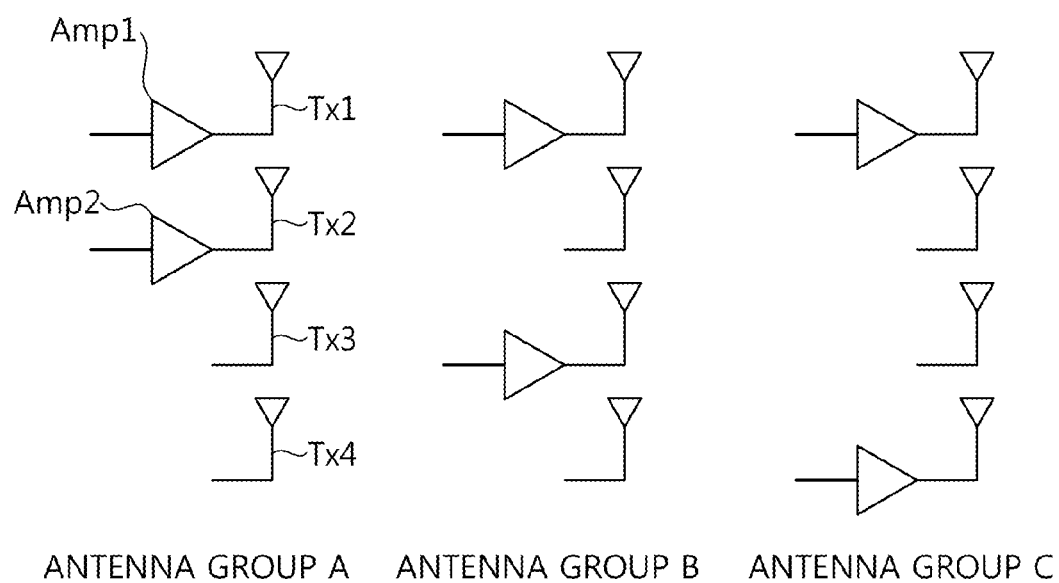
ANTENNA GROUP A    ANTENNA GROUP B    ANTENNA GROUP C
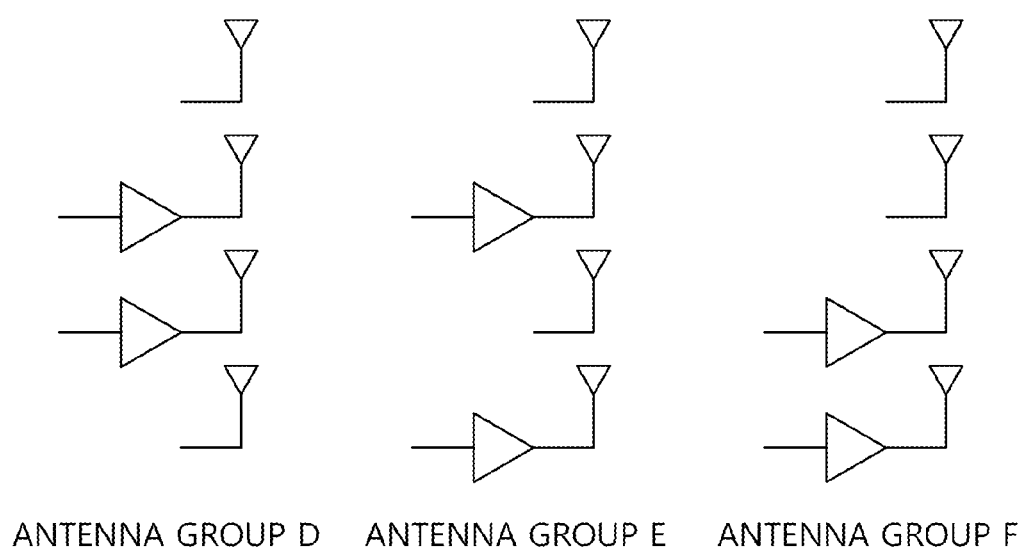
ANTENNA GROUP D    ANTENNA GROUP E    ANTENNA GROUP F

METHOD OF TRANSMITTING CONTROL INFORMATION IN WIRELESS COMMUNICATION SYSTEM

CROSS-REFERENCE TO RELATED APPLICATIONS

This application claims the benefit of priority of U.S. Provisional application Ser. No. 61/175,455 filed on May 4, 2009 and Korean Patent Application No. 10-2009-0121179 filed on Dec. 8, 2009 which are incorporated by reference in its entirety herein.

BACKGROUND

1. Technical Field

The present invention relates to wireless communications, and more particularly, to a method of transmitting control information for antenna selection in a multiple antenna system.

2. Related Art

To maximize performance and communication capability of a wireless communication system, a multiple input multiple output (MIMO) system has drawn attention in recent years. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight to multiple antennas according to a channel condition so as to increase a signal to interference plus noise ratio (SINR) of a signal. In this case, the weight can be expressed by a weight vector or a weight matrix, which is respectively referred to as a precoding vector or a precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where $Ni \leq \min\{Nt, Nr\}$. Each independent channel can be referred to as a spatial layer. A rank represents the number of non-zero eigen-values of the MIMO channel matrix and can be defined as the number of spatial streams that can be multiplexed.

Control information for data transmission is transmitted to a user equipment (UE) through a downlink control channel. Downlink control information includes various types of information required for data transmission and reception. The UE may transmit data by receiving the control information through the downlink control channel. A UE having multiple antennas may transmit data through all or some antennas. Tx antenna selection of the UE may be indicated using the control information transmitted through the downlink control channel, or may be determined according to a predetermined rule. For example, a base station (BS) may provide a UE having two Tx antennas with control information regarding selection of a first antenna or a second antenna. Alternatively, the Tx antenna may be selected by the UE on a slot or subframe basis.

At present, a UE having 4 Tx antennas is considered in the multiple antenna system. The UE may selectively transmit and receive data by using some of the 4 Tx antennas. To support the 4 Tx antennas, the UE may employ 4 power amplifiers. However, this may be ineffective when data is transmitted and received using some of the Tx antennas, and a cost of the UE may increase as a result. Among the 4 Tx antennas, some of them having high Tx/Rx efficiency may be selected for the effective use.

Accordingly, there is a need for a method of selecting some antennas to be used in data transmission and reception among a plurality of antennas employed in a UE, and a signaling method related thereto.

SUMMARY

The present invention provides a method of transmitting control information for antenna selection in a multiple antenna system.

According to an aspect of the present invention, a method of transmitting control information in a wireless communication system is provided. The method includes: transmitting an antenna group selection indicator indicating an antenna group comprising two or more activated transmit antennas among a plurality of transmit antennas; and receiving data transmitted through the transmit antennas included in the antenna group, wherein a type of the antenna group is determined according to the number of power amplifiers in use.

According to another aspect of the present invention, a method of transmitting data in a wireless communication system is provided. The method includes: receiving an antenna group selection indicator indicating an antenna group comprising two or more activated transmit antennas among a plurality of transmit antennas; selecting a transmit antenna to be activated according to the antenna group selection indicator; and transmitting the data by supplying power to a power amplifier corresponding to the selected transmit antenna, wherein the number of power amplifiers is less than the number of transmit antennas and a type of the antenna group is determined according to the number of the power amplifiers.

BRIEF DESCRIPTION OF THE DRAWINGS

FIG. 12 shows transmit antenna groups selected when the number of power amplifiers in use is less than the number of transmit antennas.

DESCRIPTION OF EXEMPLARY EMBODIMENTS

Figure 1:
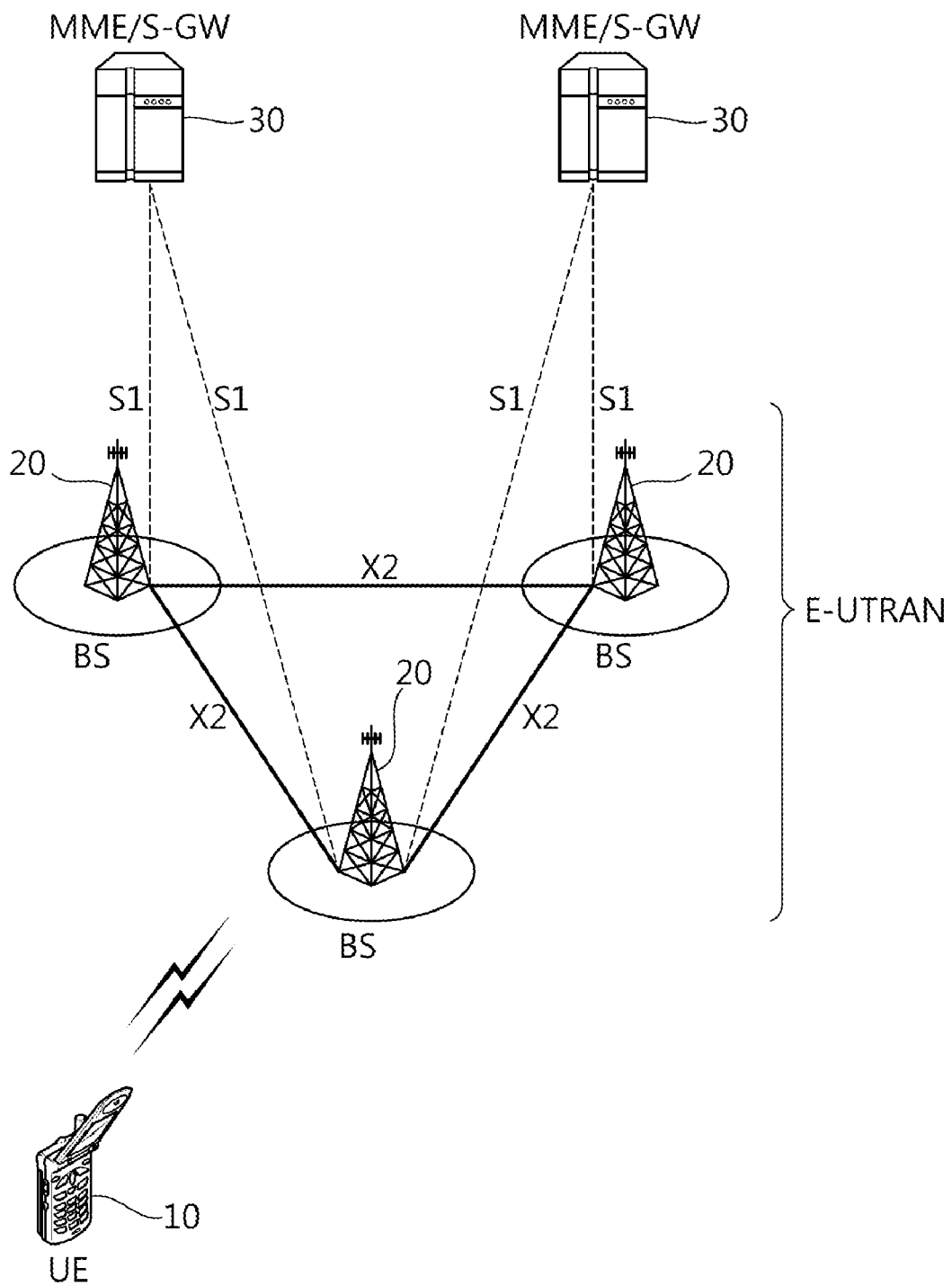
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is an area in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT on the data. A receiver restores original data by performing FFT on a received signal. The transmitter uses IFFT to combine the plurality of subcarriers, and the receiver uses FFT to split the plurality of sub carriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the frequency domain, and the TSTD is a scheme in which the signals transmitted to the multiple antennas are divided in the time domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
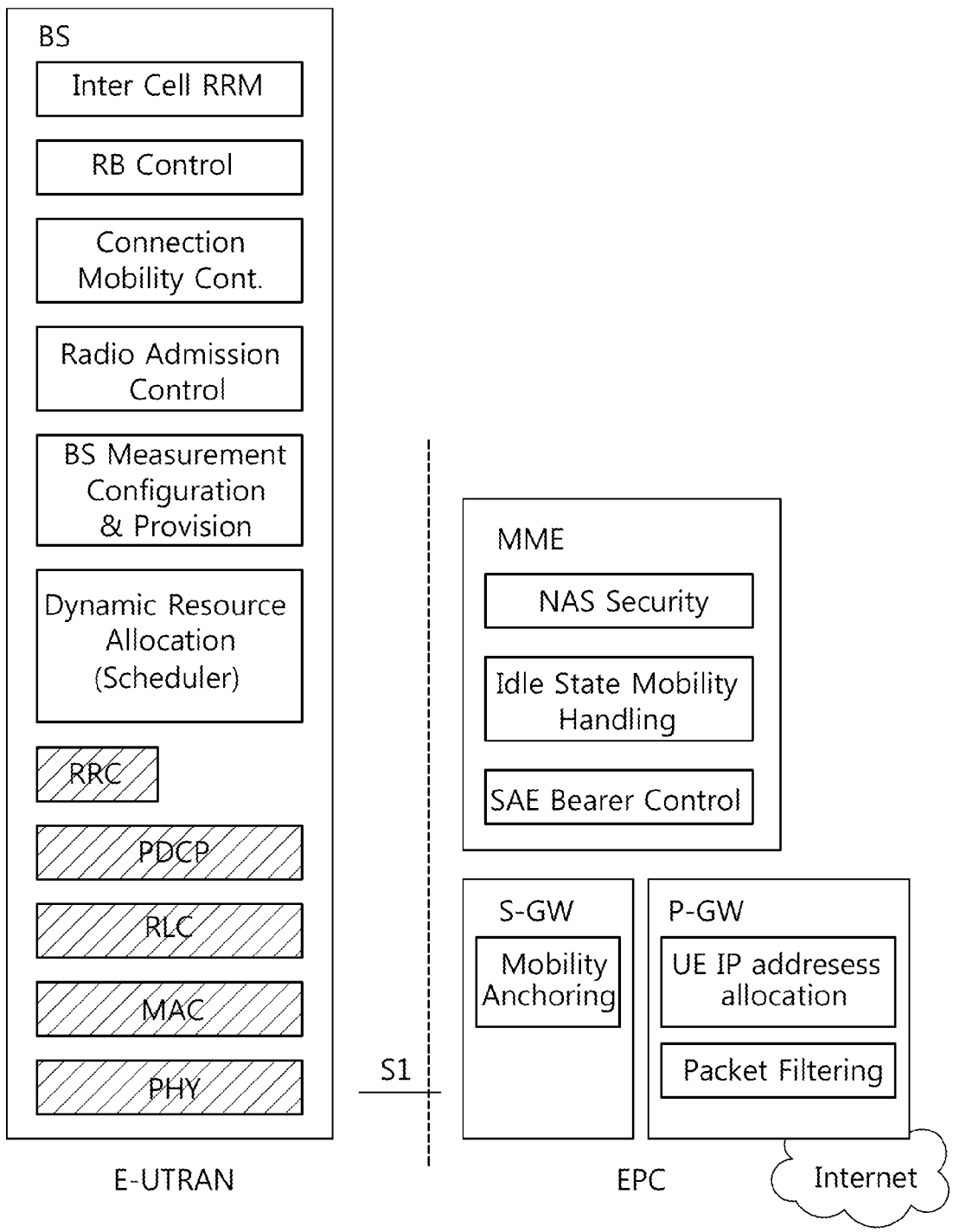
FIG. 2 is a block diagram showing functional split between an evolved universal terrestrial radio access network (E-UTRAN) and an evolved packet core (EPC).

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. A PDN gateway (P-GW) performs the following functions: (1) UE IP allocation; and (2) packet filtering.

Figure 3:
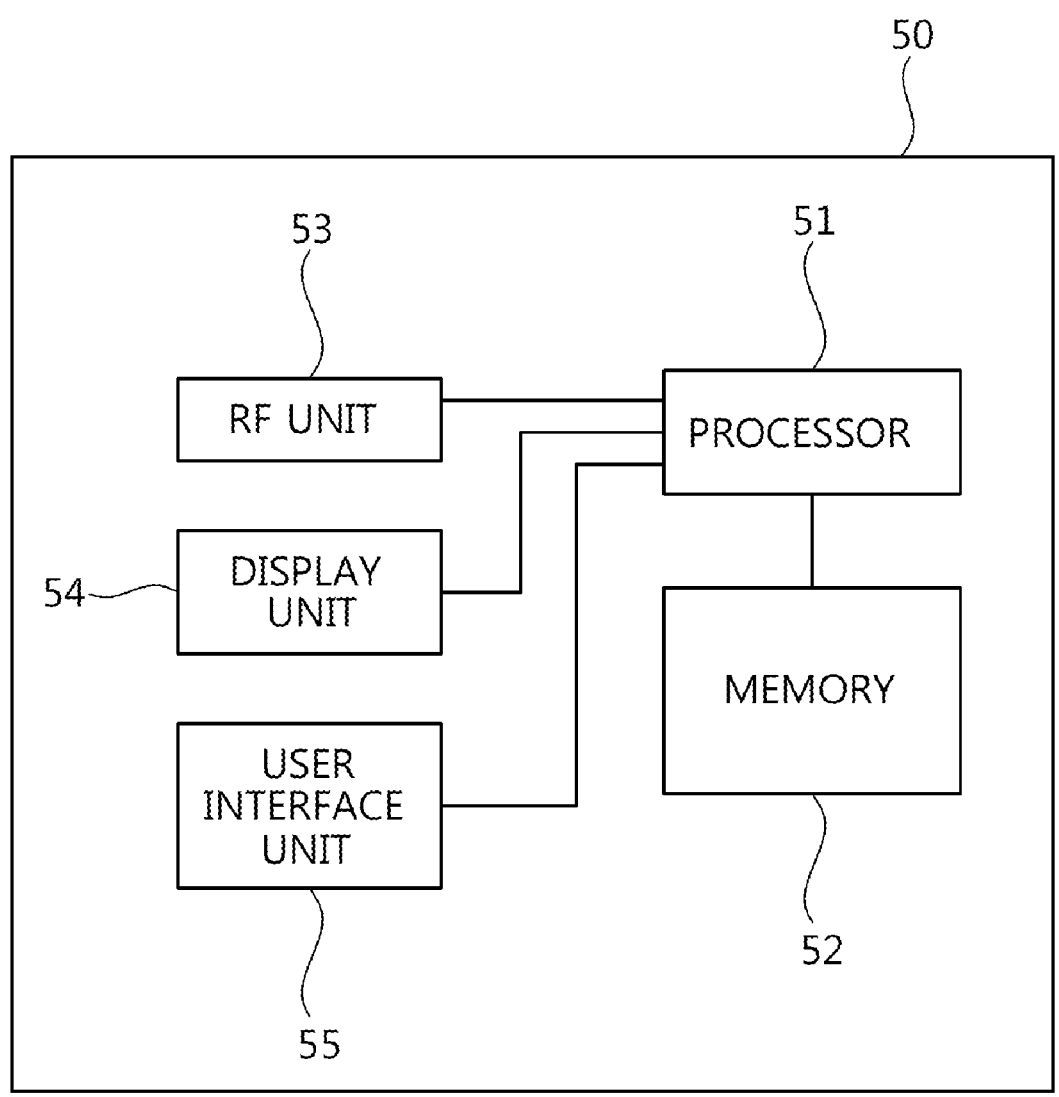
FIG. 3 is a block diagram showing constitutional elements of a user equipment.

FIG. 3 is a block diagram showing constitutional elements of a UE. A UE 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer. The PHY layer provides an information transfer service through a physical channel. The RRC layer belongs to the third layer and serves to control radio resources between the UE and the network. The UE and the network exchange RRC messages via the RRC layer.

Figure 4:
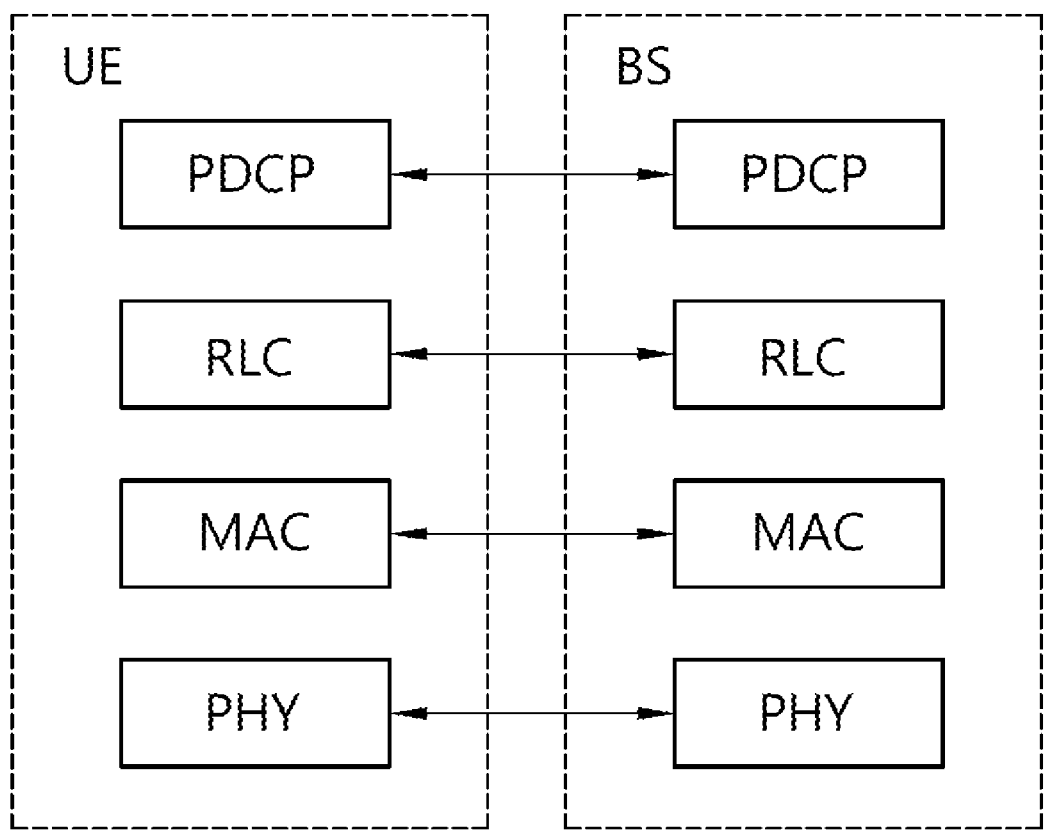
FIG. 4 is a diagram showing a radio protocol architecture for a user plane.
Figure 5:
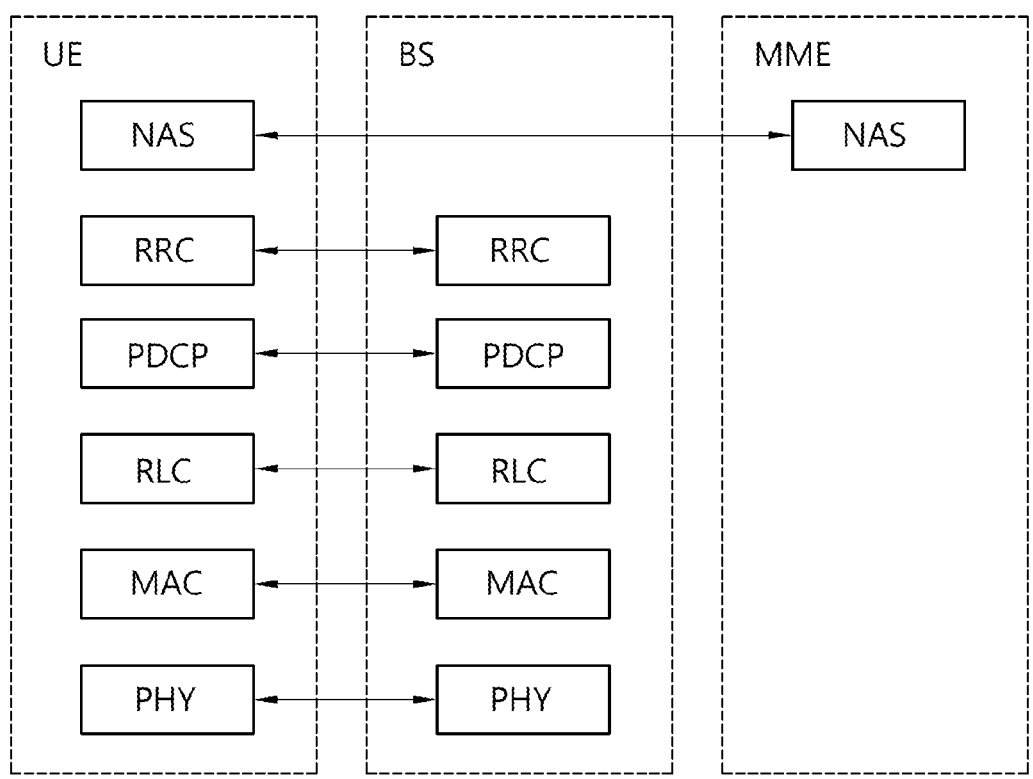
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, between different PHY layers (i.e., a PHY layer of a transmitter and a PHY layer of a receiver), data is transferred through a physical channel. The PHY layer is coupled with a MAC layer, i.e., an upper layer of the PHY layer, through a transport channel. Between the MAC layer and the PHY layer, data is transferred through the transport channel. The PHY layer provides the MAC layer and an upper layer with an information transfer service through the transport channel.

The MAC layer provides services to an RLC layer, i.e., an upper layer of the MAC layer, through a logical channel. The RLC layer supports reliable data transmission. The PDCP layer performs a header compression function to reduce a header size of an IP packet.

The RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers. A radio bearer is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 6:
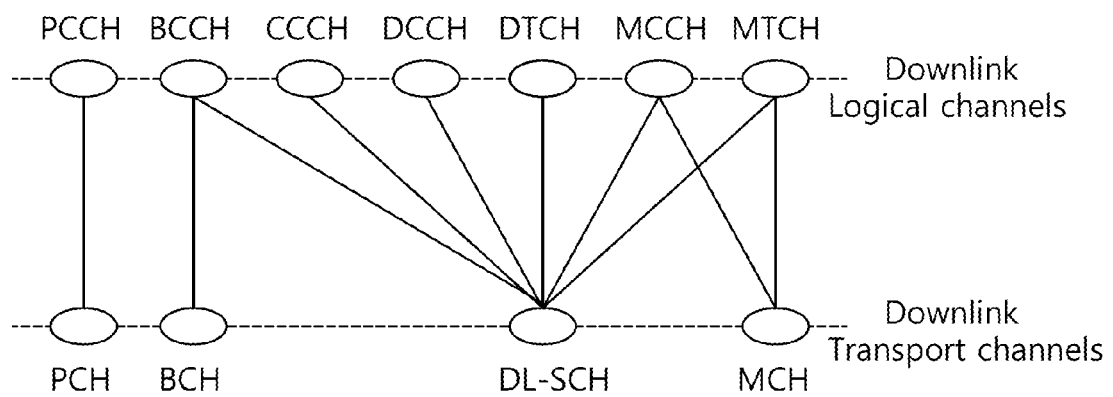
FIG. 6 shows mapping between downlink logical channels and downlink transport channels.

FIG. 6 shows mapping between downlink logical channels and downlink transport channels. The section 6.1.3.2 of 3GPP TS 36.300 V8.5.0 (2008-05) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 6, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. A logical channel is classified into two groups, i.e., a control channel and a traffic channel.

The control channel is used for the transfer of control plane information. The BCCH is a downlink control channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The DCCH is a point-to-point bi-directional channel for transmitting dedicated control information between the UE and the network, and is used by UEs having an RRC connection.

The traffic channel is used for the transfer of user plane information. The DTCH is a point-to-point channel used for the transfer of user information. The DTCH can exist in both uplink and downlink. The MTCH is a point-to-multipoint downlink channel for transmitting traffic data and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARM), support for dynamic link adaptation by varying modulation, coding, and Tx power, possibility to be broadcast in the entire cell, and possibility to use beamforming, support for both dynamic and semi-static resource allocation, support for discontinuous reception (DRX) to enable UE power saving, and support for MBMS transmission. The PCH is characterized by support for DRX to enable UE power saving and support for broadcast in the entire coverage area of the cell. The MCH is characterized by support for broadcast in the entire coverage area of the cell and support for an MBMS single frequency network (MBSFN).

Figure 7:
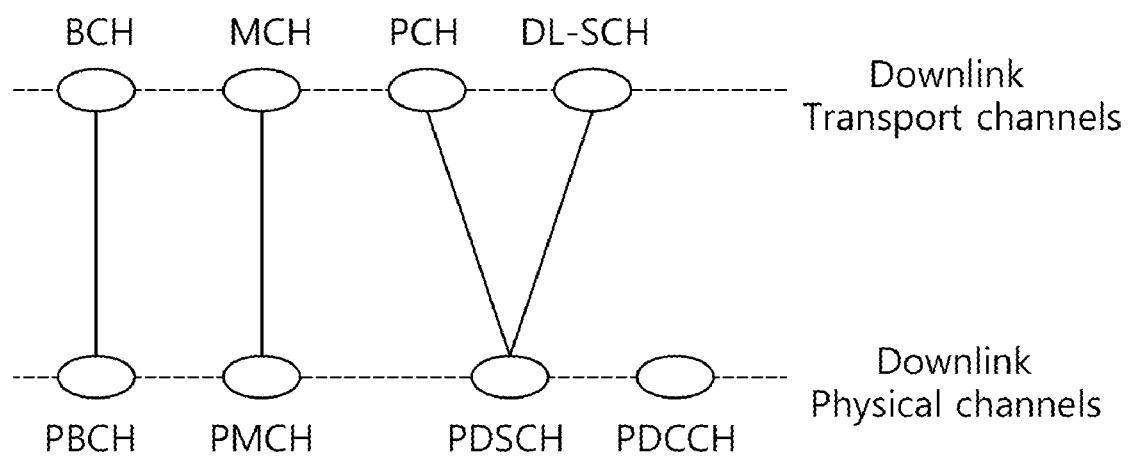
FIG. 7 shows mapping between downlink transport channels and downlink physical channels.

FIG. 7 shows mapping between downlink transport channels and downlink physical channels. The section 5.3.1 of 3GPP TS 36.300 V8.5.0 (2008-05) may be incorporated herein by reference.

Referring to FIG. 7, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Examples of a downlink physical control channel used in the PHY layer include a physical downlink control channel (PDCCH), a physical control format indicator channel (PCFICH), a physical hybrid ARQ indicator channel (PHICH), etc. The PDCCH informs a UE of resource assignment of the PCH and DL-SCH, and also informs the UE of HARQ information related to the DL-SCH. The PDCCH may carry an uplink scheduling grant which informs the UE of resource assignment for uplink transmission. The PCFICH informs the UE of the number of OFDM symbols used for transmission of the PDCCHs within a subframe. The PCFICH can be transmitted in every subframe. The PHICH carries HARQ acknowledgement (ACK)/negative-acknowledgement (NACK) signals in response to uplink transmission.

Figure 8:
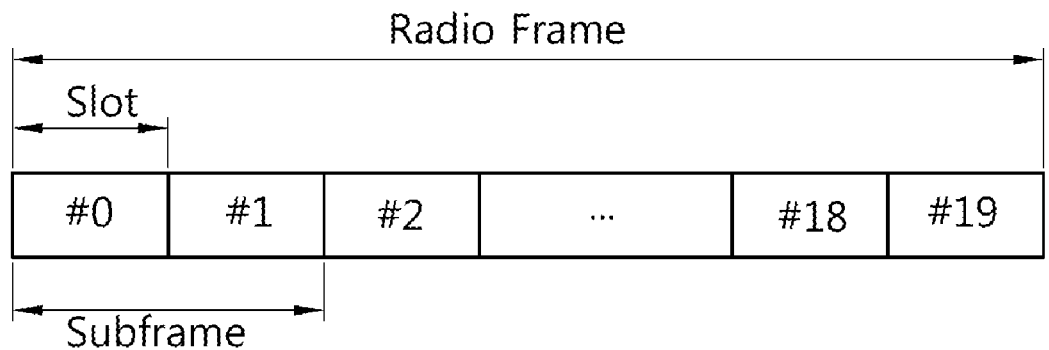
FIG. 8 shows a structure of a radio frame.

FIG. 8 shows a structure of a radio frame.

Referring to FIG. 8, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 8 is shown for exemplary purposes only. Thus, the number of subframes included in the radio frame or the number of slots included in the subframe or the number of OFDM symbols included in the slot may change variously.

Figure 9:
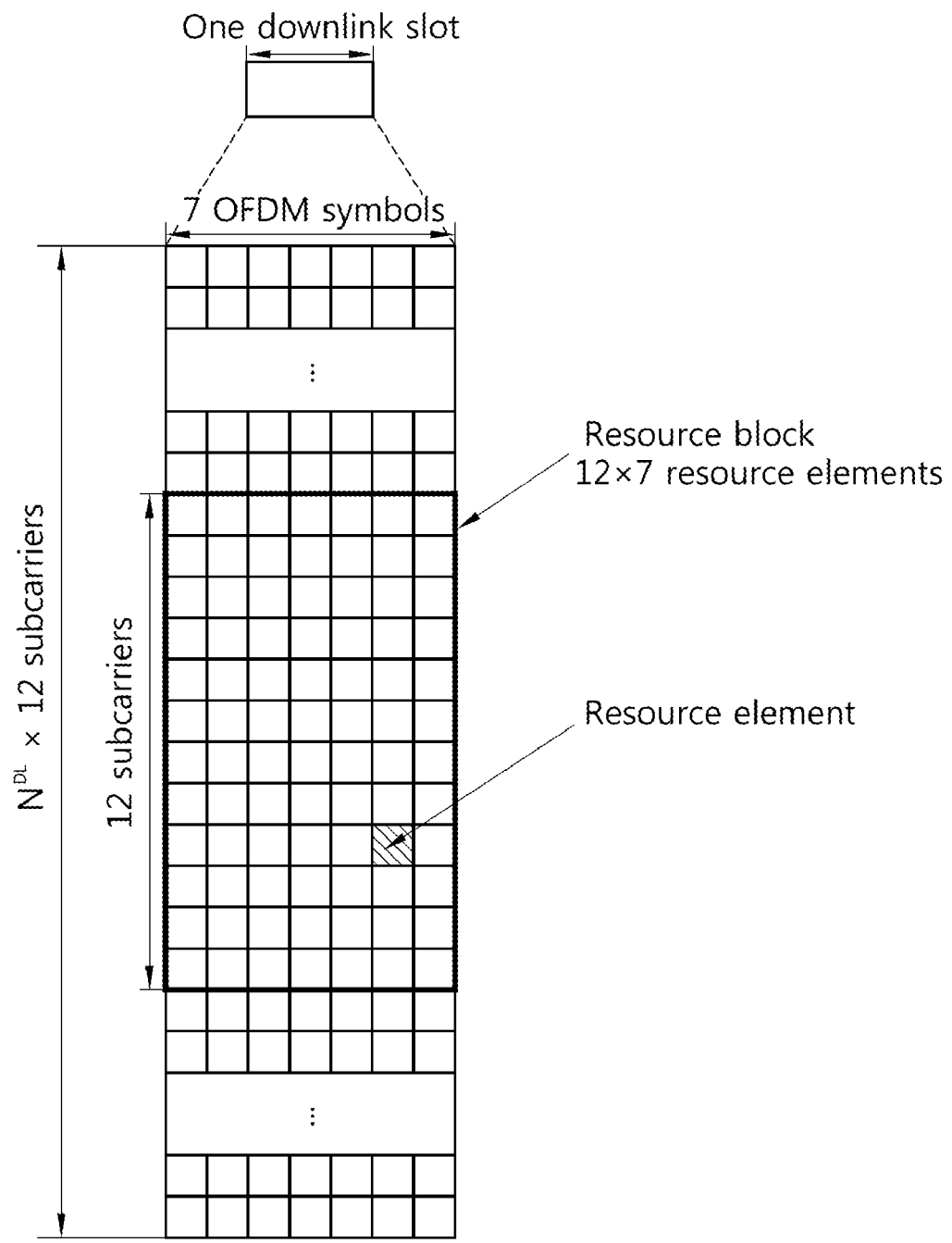
FIG. 9 shows an example of a resource grid for one downlink slot.

FIG. 9 shows an example of a resource grid for one downlink slot.

Referring to FIG. 9, the downlink slot includes a plurality of OFDM symbols in a time domain and $N^{DL}$ resource blocks (RBs) in a frequency domain. The number $N^{DL}$ of resource blocks included in the downlink slot depends on a downlink transmission bandwidth determined in a cell. For example, in an LTE system, $N^{DL}$ may be any one value in the range of 60 to 110. One RB includes a plurality of subcarriers in the frequency domain.

Each element on the resource grid is referred to as a resource element. The resource element on the resource grid can be identified by an index pair (k, l) within the slot. Herein, $k(k=0, \ldots, N^{DL} \times 12-1)$ denotes a subcarrier index in the frequency domain, and $l(l=0, \ldots, 6)$ denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048. A resource grid for an uplink slot may be configured in the same structure as the resource grid for the downlink slot.

Figure 10:
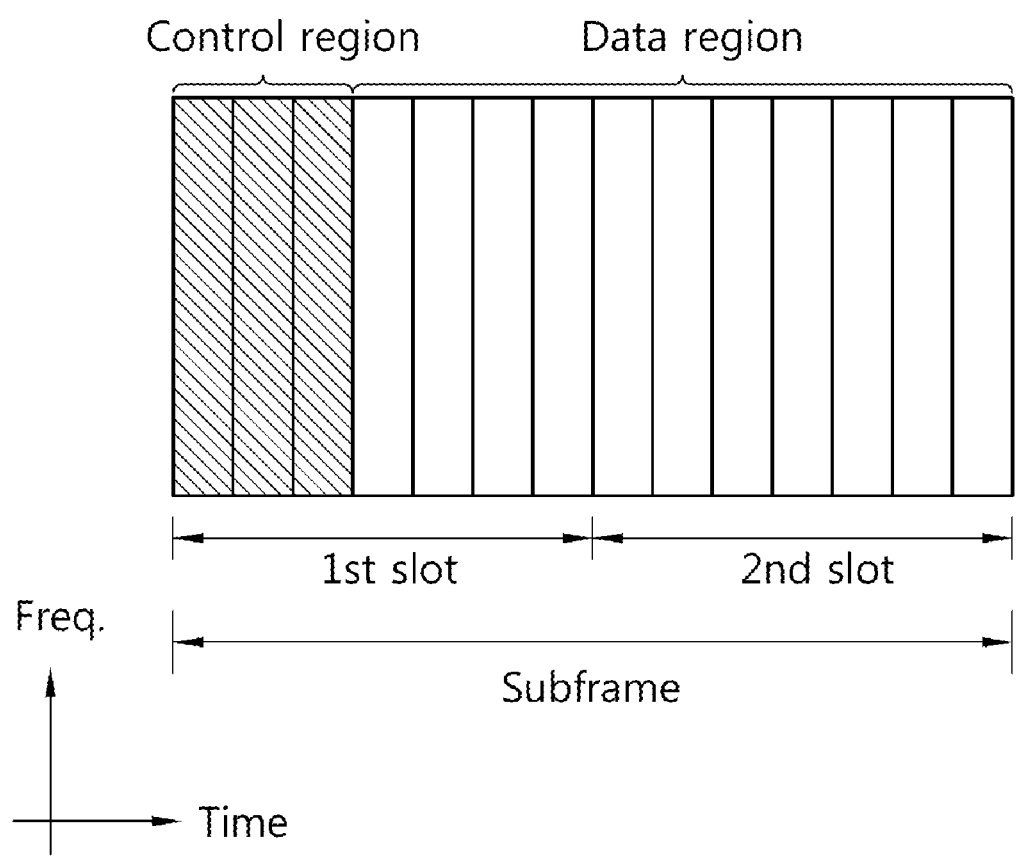
FIG. 10 shows a structure of a subframe.

FIG. 10 shows a structure of a subframe.

Referring to FIG. 10, the subframe includes two consecutive slots. A maximum of three OFDM symbols located in a front portion of a 1st slot within the subframe correspond to a control region to be assigned with a PDCCH. The remaining OFDM symbols correspond to a data region to be assigned with a PDSCH. In addition to the PDCCH, control channels such as a PCFICH, a PHICH, etc., can be assigned to the control region. The UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region. The number of OFDM symbols included in the control region of the subframe can be known by using the PCFICH.

The control region consists of a plurality of control channel elements (CCEs) that is a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of {1, 2, 4, 8}.

Table 1 below shows examples of the PDCCH format and the number of available PDCCH bits according to the CCE aggregation level.

TABLE 1

| PDCCH format | CCE aggregation level | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 11:
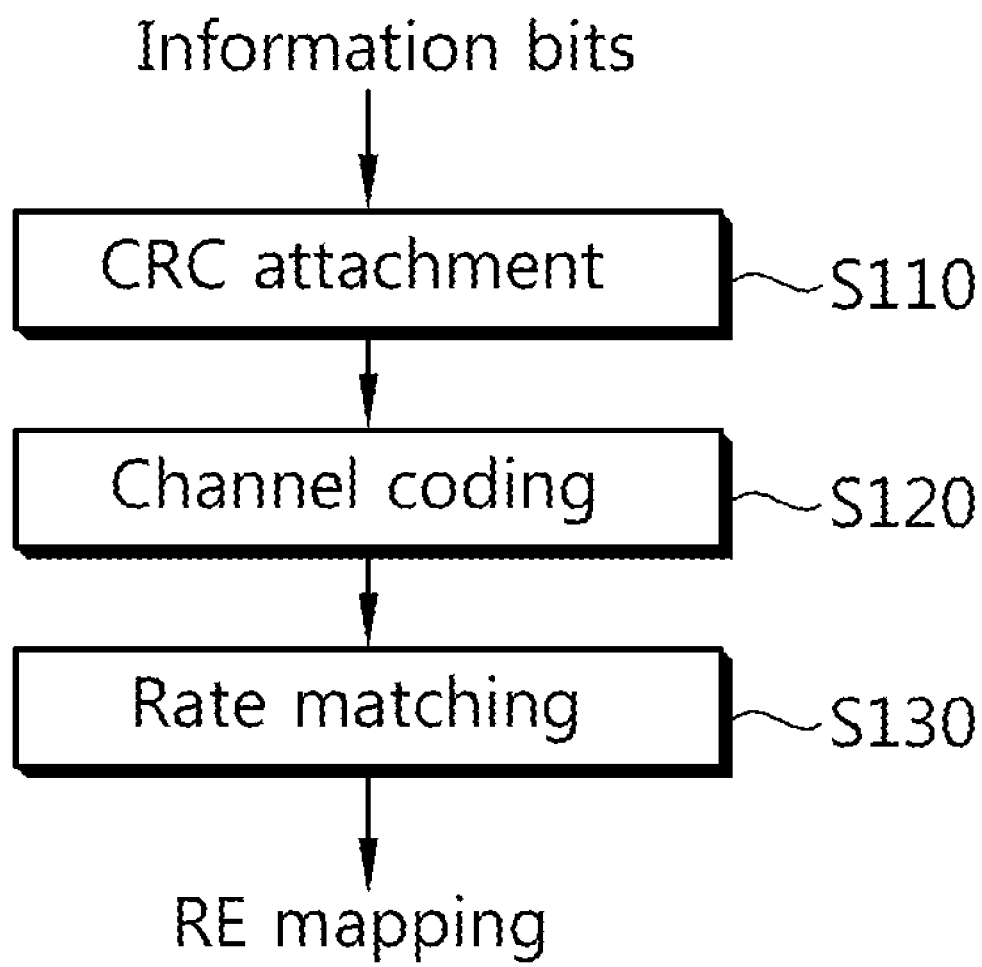
FIG. 11 is a flowchart showing a method of configuring a physical downlink control channel (PDCCH).

FIG. 11 is a flowchart showing a method of configuring a PDCCH.

Referring to FIG. 11, information bits of control information are arranged to constitute a plurality of information fields. The plurality of information fields are multiplexed according to an order of a DCI format list. A BS may select one DCI format from a plurality of DCI formats according to the control information to be transmitted.

A cyclic redundancy check (CRC) for error detection is attached to the control information conforming to the DCI format (step S110). An identifier (i.e., a radio network temporary identifier (RNTI)) is masked to the CRC according to a usage or owner of the PDCCH. Examples of the RNTI include a cell (C)-RNTI that is a unique identifier, a temporary C-RNTI that is a temporary identifier of a UE and is used in a random access process, a paging (P)-RNTI that is an identifier for a paging message transmitted through a PCH, a system information (SI)-RNTI for system information transmitted through a DL-SCH, a random access (RA)-RNTI for a random access response to a random access preamble of the UE, etc.

When Tx antenna selection of the UE can be configured or applied, a CRC parity bit of the PDCCH in the DCI format 0 is scrambled with an antenna selection mask and a corresponding RNTI to form a sequence bit.

Table 2 shows an example of the UE's Tx antenna selection mask to be scrambled with the CRC parity bit. This is a case where the UE has two Tx antenna ports.

TABLE 2

| UE transmit antenna selection | Antenna selection mask $<x_{AS,0}, x_{AS,1}, \ldots, x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

A CRC-attached sequence $c_k$ formed by being scrambled with an antenna selection mask and a corresponding RNTI can be expressed by Equation 1.

$$c_k = b_k \text{ for } k=0, 1, 2, \ldots, A-1$$

$$c_k = (b_k + x_{rnti,k-A} + x_{AS,k-A}) \bmod 2 \text{ for } k=A, A+1, A-2, \ldots, A+15.$$ [Equation 1]

Herein, A denotes an information bit of control information, i.e., a payload size of the PDCCH, L denotes the number of parity bits, and $b_k$ denotes a sequence attached with a parity bit and having a length B=A+L. The corresponding RNTI is $x_{rnti,0}, x_{rnti,1}, \ldots, x_{rnti,15}$.

Channel coding is performed on the CRC-attached control information to generate coded data (step S120). A rate matching is performed on the coded data according to a CCE aggregation level assigned to the PDCCH format (step S130). The coded data is modulated to generate modulation symbols. The CCE aggregation level of modulation symbols constituting one PDCCH may be one of 1, 2, 4, and 8. The modulation symbols are mapped to physical resource elements.

As such, Tx antenna selection of the UE can be indicated by using the antenna selection mask in the DCI format 0. When the BS indicates the Tx antenna selection of the UE, it is referred to as closed-loop antenna selection. On the other hand, when the UE selects the antenna on a slot or subframe basis, it is referred to as open-loop antenna selection. In the open-loop antenna selection, the UE may select the Tx antenna according to a slot or subframe number.

In MU-MIMO, a dedicated reference signal to which a precoding weight is applied may be used. The precoding weight is used to transmit data to a specific UE. The dedicated reference signal may also be referred to as a demodulation reference signal or a dedicated pilot. The dedicated reference signals applied to respective UEs are orthogonal to each other by using different cycling shifts.

If the UE has two Tx antennas, as exemplified above, any one Tx antenna may be indicated by using the antenna selection mask in the DCI format 0. A method of selecting a Tx antenna by a UE and a signaling method related thereto are necessary for a case where the UE has more than two Tx antennas and uses two or less power amplifiers. For example, the UE may have 4 Tx antennas and use 2 or 4 power amplifiers. Although the number of Tx antennas employed by the UE is not limited, it is assumed in the following description that the UE has 2 or 4 Tx antennas.

Table 3 shows an example of a UE category with respect to the number of antennas and the number of power amplifiers of the UE.

TABLE 3

| | Category | | |
|---|---|---|---|
| | A | B | C |
| Number of antennas | 2 | 4 | 4 |
| Number of power amplifiers | 2 | 2 | 4 |
| Maximum power of power amplifier | Pmax1 Pmax2 | Pmax1 Pmax2 | Pmax1 Pmax2 Pmax3 Pmax4 |
| Case 1 | 23 dBm 23 dBm | 23 dBm 23 dBm | 23 dBm 23 dBm 23 dBm 23 dBm |
| Case 2 | 23 dBm 20 dBm | 23 dBm 20 dBm | 23 dBm 23 dBm 20 dBm 20 dBm |
| Case 3 | 20 dBm 20 dBm | 20 dBm 20 dBm | 23 dBm 17 dBm 17 dBm 17 dBm |
| Case 4 | 23 dBm 17 dBm | 23 dBm 17 dBm | 17 dBm 17 dBm 17 dBm 17 dBm |

If the UE uses 2 Tx antennas and 2 power amplifiers (category A), the power amplifiers respectively correspond to the Tx antennas. If the UE uses 4 Tx antennas and 2 power amplifiers (category B), each power amplifier may correspond to 2 Tx antennas among the 4 Tx antennas. If the maximum power of one power amplifier is denoted by Pmax, a maximum Tx power level of the UE using 2 power amplifiers may be determined such as Pmax+Pmax, Pmax+Pmax/2, Pmax/2+Pmax/2, Pmax+Pmax/4, etc. For example, if it is assumed that a maximum Tx power level of a UE using a single power amplifier is 23 dBm, the maximum Tx power level of the UE can be determined such as 23 dBm+23 dBm, 23 dBm+20 dBm, 20 dBm+20 dBm, 23 dBm+17 dBm, etc.

If the UE has 4 Tx antennas and 4 power amplifiers (category C), the power amplifiers respectively correspond to the Tx antennas. A maximum Tx power level of the UE using 4 power amplifiers may be determined such as Pmax+Pmax+Pmax+Pmax, Pmax+Pmax+Pmax/2+Pmax/2, Pmax+Pmax/4+Pmax/4+Pmax/4, Pmax/4+Pmax/4+Pmax/4+Pmax/4, etc. For example, if it is assumed that a maxim Tx power level of a UE using a single power amplifier is 23 dBm, the maximum Tx power level of the UE can be determined such as 23 dBm+23 dBm+23 dBm+23 dBm, 23 dBm+23 dBm+20 dBm+20 dBm, 23 dBm+17 dBm+17 dBm+17 dBm, 17 dBm+17 dBm+17 dBm+17 dBm, etc. In addition thereto, the maximum power of the 4 power amplifiers used by the UE can be configured variously without restriction.

Table 4 shows an example of a maximum rank number and a codebook type with respect to the number of antennas and the number of power amplifiers of a UE.

TABLE 4

| Category | | A | B | C |
|---|---|---|---|---|
| Number of antennas | | 2 | 4 | 4 |
| Number of power amplifiers | | 2 | 2 | 4 |
| Maximum rank number | | 2 | 2 | 4 |
| Codebook type | Rank 1 | AS + Combining | AS + Combining | AGS + Combining |
| | Rank 2 | Identity matrix | Identity matrix | AS Identity + CMPP |
| | Rank 3 | — | — | AS + CMPP(or CMF) |
| | Rank 4 | — | — | Identity matrix |

In the UE categories A and B, data can be transmitted through 2 Tx antennas by using 2 power amplifiers, and thus a maximum rank is 2. In the UE category C, data can be transmitted through 4 Tx antennas by using 4 power amplifiers, and thus a maximum rank is 4. In the categories A and B, a rank-1 codebook may consist of an antenna selection (AS) vector and an antenna combining vector, and a rank-2 codebook may consist of an identity matrix. In the category C, a rank-1 codebook may consist of an antenna group selection (AGS) vector and an antenna combining vector, and a rank-2 codebook may consist of an AS identity vector and a cubic metric preserving precoding (CMPP) vector. The CMPP denotes precoding configured to maintain a low cubic metric (CM). In the category C, a rank-3 codebook may consist of an AS vector, a CMPP vector (or a cubic metric friendly (CMF) vector), etc., and a rank-4 codebook may consist of an identity matrix. The CMF denotes precoding configured to be able to increase a spatial multiplexing effect even if the CM is slightly higher than the CMPP.

Now, a method of selecting an antenna group and a signaling method related thereto will be described when the number of power amplifiers in use is less than the number of Tx antennas as in the case of the UE category B.

FIG. 12 shows Tx antenna groups selected when the number of power amplifiers in use is less than the number of Tx antennas.

Referring to FIG. 12, it is assumed that 4 Tx antennas Tx1, Tx2, Tx3, and Tx4 and 2 power amplifiers Amp1 and Amp2 are used. The 2 power amplifiers correspond to 2 Tx antennas selected among the 4 Tx antennas. The selected 2 Tx antennas are referred to as an antenna group. A type of the antenna group can be classified into an antenna group A of (Tx1, Tx2), an antenna group B of (Tx1, Tx3), an antenna group C of (Tx1, Tx4), an antenna group D of (Tx2, Tx3), an antenna group E of (Tx2, Tx4), and an antenna group F of (Tx3, Tx4). That is, the type of the antenna group can be determined according to the number of power amplifiers in use.

When using 4 Tx antennas and 2 power amplifiers, 6 antenna groups can be created, and signaling related thereto may indicate all of the 6 antenna groups or may indicate only some determined antenna groups. An activated antenna group may be indicated by an antenna group selection indicator having one or more bits. The antenna group selection indicator indicates an antenna group including two or more activated Tx antennas among a plurality of Tx antennas. In closed antenna selection in which a BS indicates a Tx antenna of a UE, the antenna group selection indicator may be transmitted from the BS to the UE. Alternatively, in open loop antenna selection in which the UE selects its own Tx antenna, the antenna group selection indicator may be transmitted from the UE to the BS.

If the antenna group is indicated by a 1-bit antenna group selection indicator, 2 antenna groups may be predetermined among the 6 antenna groups and the antenna group selection indicator may indicate any one of the 2 antenna groups. The 2 antenna groups may include different antennas. For example, the predetermined antenna groups may be antenna groups A and F, or the antenna groups B and E, or the antenna groups C and D, etc. Regarding the predetermined antenna groups A and F, bit values of 0 and 1 may respectively indicate the antenna groups A and F. Regarding the predetermined antenna groups B and E, bit values of 0 and 1 may respectively indicate the antenna groups B and E. Regarding the predetermined antenna groups C and D, bit values of 0 and 1 may respectively indicate the antenna groups C and D. When using the 1-bit antenna group selection indicator, the antenna group can be indicated with a small number of bits, and the antenna groups in use may be limited to 2 types.

If the antenna group is indicated by a 2-bit antenna group selection indicator, 4 antenna groups may be predetermined among the 6 antenna groups and the antenna group selection indicator may indicate any one of the 4 antenna groups. For example, the predetermined antenna groups may be antenna groups A, F, B, and E or the antenna groups A, F, C, and D or the antenna groups B, E, C, and D, etc. Regarding the predetermined antenna groups A, F, B, and E, bit values of 00, 01, 10, and 11 may respectively indicate the antenna groups A, F, B, and E. Regarding the predetermined antenna groups A, F, C, and D, bit values of 00, 01, 10, and 11 may respectively indicate the antenna groups A, F, C, and D. Regarding the predetermined antenna groups B, E, C, and D, bit values of 00, 01, 10, and 11 may respectively indicate the antenna groups B, E, C, and D. When using the 2-bit antenna group selection indicator, one more bit is required in comparison with the case of using the 1-bit antenna group selection indicator, and 4 types of antenna groups can be used.

Antenna groups selected in advance from all antenna groups are not limited in terms of types, and an antenna group indicated according to the bit value of the antenna group selection indicator can be configured variously without restriction.

If the antenna group is indicated by a 3-bit antenna group selection indicator, all of the 6 antenna groups can be indicated. For example, bit values of 000, 001, 010, 011, 100, and 101 may respectively indicate antenna groups A, F, B, E, C, and D. The antenna group indicated by the bit value of the antenna group selection indicator is for exemplary purposes only, and the present invention is not limited thereto.

Figure 13:
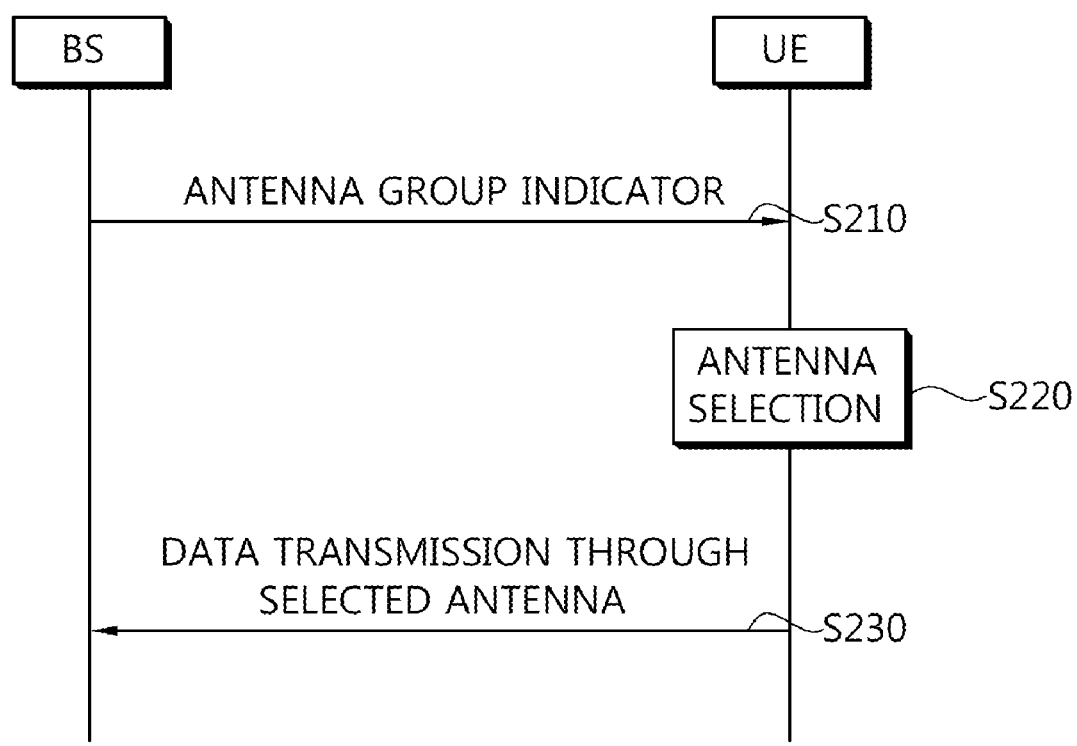
FIG. 13 shows an example of a method of transmitting control information for antenna selection in a multiple antenna system.

FIG. 13 shows an example of a method of transmitting control information for antenna selection in a multiple antenna system.

Referring to FIG. 13, a BS transmits an antenna group selection indicator to a UE (step S210). The antenna group selection indicator may be transmitted by using RRC signaling or L1/L2 signaling or a codebook.

The RRC signaling may include the antenna group selection indicator indicating an antenna group to be used by the UE. The antenna group selection indicator may indicate 2 activated Tx antennas among 4 Tx antennas. That is, transmission using 4 Tx antennas may operate in combination with transmission using 2 Tx antennas. In this case, 2Tx-codebooks may be combined to be used as a 4Tx-codebook. The 2Tx-codebook denotes a codebook for transmission using 2 Tx antennas. The 4Tx-codebook denotes a codebook for transmission using 4 Tx antennas.

The L1/L2 signaling may include the antenna group selection indicator by using an antenna selection mask to be masked to a CRC.

Table 5 shows an example of an antenna selection mask indicating a 1-bit antenna group selection indicator.

TABLE 5

| UE transmit antenna selection | Antenna selection mask $<x_{AS,\,0}, x_{AS,\,1}, \ldots, x_{AS,\,15}>$ |
|---|---|
| UE port group 0 | <0, 0, 0, 0, 0, 0, 0, 0, 0, 0, 0, 0, 0, 0, 0, 0> |
| UE port group 1 | <0, 0, 0, 0, 0, 0, 0, 0, 0, 0, 0, 0, 0, 0, 0, 1> |

Table 6 shows an example of an antenna selection mask indicating a 2-bit antenna group selection indicator.

TABLE 6

| UE transmit antenna selection | Antenna selection mask $<x_{AS,\,0}, x_{AS,\,1}, \ldots, x_{AS,\,15}>$ |
|---|---|
| UE port group 0 | <0, 0, 0, 0, 0, 0, 0, 0, 0, 0, 0, 0, 0, 0, 0, 0> |
| UE port group 1 | <0, 0, 0, 0, 0, 0, 0, 0, 0, 0, 0, 0, 0, 0, 0, 1> |
| UE port group 2 | <0, 0, 0, 0, 0, 0, 0, 0, 0, 0, 0, 0, 0, 0, 1, 0> |
| UE port group 3 | <0, 0, 0, 0, 0, 0, 0, 0, 0, 0, 0, 0, 0, 0, 1, 1> |

Table 7 shows an example of an antenna selection mask indicating a 3-bit antenna group selection indicator.

TABLE 7

| UE transmit antenna selection | Antenna selection mask $<x_{AS,\,0}, x_{AS,\,1}, \ldots, x_{AS,\,15}>$ |
|---|---|
| UE port group 0 | <0, 0, 0, 0, 0, 0, 0, 0, 0, 0, 0, 0, 0, 0, 0, 0> |
| UE port group 1 | <0, 0, 0, 0, 0, 0, 0, 0, 0, 0, 0, 0, 0, 0, 0, 1> |
| UE port group 2 | <0, 0, 0, 0, 0, 0, 0, 0, 0, 0, 0, 0, 0, 0, 1, 0> |
| UE port group 3 | <0, 0, 0, 0, 0, 0, 0, 0, 0, 0, 0, 0, 0, 0, 1, 1> |
| UE port group 4 | <0, 0, 0, 0, 0, 0, 0, 0, 0, 0, 0, 0, 0, 1, 0, 0> |
| UE port group 5 | <0, 0, 0, 0, 0, 0, 0, 0, 0, 0, 0, 0, 0, 1, 0, 1> |

When the UE has 2 Tx antenna ports in the closed-loop antenna selection, the antenna selection mask indicates any one of the two antennas, whereas when the UE has two or more Tx antenna ports, the antenna selection mask indicating the antenna group selection indicator indicates any one antenna group among a plurality of antenna groups including a plurality of Tx antennas. The antenna group selection indicator may indicate two activated Tx antennas among 4 Tx antennas, and thus transmission using 4 Tx antennas may operate in combination with transmission using 2 Tx antennas. In this case, 2Tx-codebooks may be combined to be used as a 4Tx-codebook.

The codebook may be used to indicate the activated antenna group. Table 8 shows an example of a rank-1 codebook indicating the activated antenna group.

TABLE 8

| 0 | 1 | 2 | 3 | 4 | 5 |
|---|---|---|---|---|---|
| $\begin{bmatrix} a \\ b \\ 0 \\ 0 \end{bmatrix}$ | $\begin{bmatrix} a \\ 0 \\ b \\ 0 \end{bmatrix}$ | $\begin{bmatrix} a \\ 0 \\ 0 \\ b \end{bmatrix}$ | $\begin{bmatrix} 0 \\ a \\ b \\ 0 \end{bmatrix}$ | $\begin{bmatrix} 0 \\ a \\ 0 \\ b \end{bmatrix}$ | $\begin{bmatrix} 0 \\ 0 \\ a \\ b \end{bmatrix}$ |

Herein, a and b are complex values other than zero. For example, when 4 phase shift keying (PSK) modulation is considered, a and b may have values of +1, −1, +j, −j. When 8 PSK modulation is considered, a and b may have values of +1, −1, +j, −j, $(+1+j)/\sqrt{2}$, $(-1+j)/\sqrt{2}$, $(-1-j)/\sqrt{2}$, $(+1-j)/\sqrt{2}$.

The rank-1 codebook indicates 6 types of antenna groups indicating 2 Tx antennas selected among 4 Tx antennas. The BS may report to the UE an index of the rank-1 codebook as the antenna group selection indicator. For example, with respect to the antenna group of FIG. 12, indices 0, 1, 2, 3, 4, and 5 of the rank-1 codebook may respectively indicate antenna groups A, B, C, D, E, and F.

If the number of bits of the antenna group selection indicator indicating the rank-1 codebook index is 1 bit, 2 vectors may be selected among 6 vectors included in the rank-1 codebook and thus may be used for antenna group selection. For example, the selected 2 vectors may be vectors indexed with rank-1 codebook indices 0 and 5 or vectors indexed with 1 and 4 or vectors indexed with 2 and 3, and the antenna group selection indicator may indicate any one of the 2 selected vectors.

If the number of bits of the antenna group selection indicator indicating the rank-1 codebook index is 2 bits, 4 vectors may be selected among the 6 vectors included in the rank-1 codebook and thus may be used for antenna group selection. For example, the selected 4 vectors may be vectors indexed with rank-1 codebook indices 0, 5, 1, and 4. Alternatively, the selected 4 vectors may be vectors indexed with rank-1 codebook indices 0, 5, 2, and 3. Alternatively, the selected 4 vectors may be vectors indexed with rank-1 codebook indices 1, 4, 2, and 3. The antenna group selection indicator may indicate any one of the 4 selected vectors.

If the number of bits of the antenna group selection indicator indicating the rank-1 codebook index is 3 bits, all of the 6 vectors included in the rank-1 codebook may be selected and used for antenna group selection. The antenna group selection indicator may indicate any one of the 6 selected vectors.

Table 9 shows an example of a rank-2 codebook indicating the activated antenna group.

TABLE 9

| 0 | 1 | 2 | 3 | 4 | 5 |
|---|---|---|---|---|---|
| $\begin{bmatrix} 1 & 0 \\ 0 & 1 \\ 0 & 0 \\ 0 & 0 \end{bmatrix}$ | $\begin{bmatrix} 1 & 0 \\ 0 & 0 \\ 0 & 1 \\ 0 & 0 \end{bmatrix}$ | $\begin{bmatrix} 1 & 0 \\ 0 & 0 \\ 0 & 0 \\ 0 & 1 \end{bmatrix}$ | $\begin{bmatrix} 0 & 0 \\ 1 & 0 \\ 0 & 1 \\ 0 & 0 \end{bmatrix}$ | $\begin{bmatrix} 0 & 0 \\ 1 & 0 \\ 0 & 0 \\ 0 & 1 \end{bmatrix}$ | $\begin{bmatrix} 0 & 0 \\ 0 & 0 \\ 1 & 0 \\ 0 & 1 \end{bmatrix}$ |

Similarly to the rank-1 codebook, 2 or 4 vectors may be selected among 6 vectors included in the rank-2 codebook and thus may be used for antenna group selection, or all of the 6 vectors may be selected and used for antenna group selection. The antenna group selection indicator may indicate any one of the selected vectors or any one of all of the vectors.

The UE selects a Tx antenna to be activated according to the antenna group selection indicator (step S220). The UE transmits data through the selected Tx antenna (step S230). The UE supplies power to a power amplifier corresponding to a Tx antenna included in an antenna group indicated by the antenna group selection indicator, and transmits data through the Tx antenna. The BS receives the data transmitted through the Tx antenna indicated by the antenna group selection indicator.

It is described herein that the BS reports the antenna group selection indicator to the UE according to closed-loop antenna selection. In case of using open-loop antenna selection, the BS may not report the antenna group selection indicator. Further, the UE may select the Tx antenna according to a predetermined rule, and may report the selected Tx antenna to the BS by using the antenna selection indicator. In this case, the UE may transmit the antenna selection indicator together with data through a PUCCH or a PUSCH.

Meanwhile, if the number of Tx antennas is equal to the number of power amplifiers, some Tx antennas to be activated may be selected and indicated among a plurality of Tx antennas. For example, the UE may have 4 Tx antennas and 4 power amplifiers. The power amplifiers respectively correspond to the Tx antennas. In this case, some of the power amplifiers may be powered off to activate some of the Tx antennas. That is, the power amplifier of the Tx antenna to be activated according to the antenna group selection indicator may remain in a power-on state while the power amplifiers of the remaining Tx antennas is powered off. Therefore, even if the number of Tx antennas is equal to the number of power amplifiers, the antenna group may be selected according to the aforementioned signaling method of the antenna group selection indicator.

According to the present invention, information on an antenna group in use among a plurality of antennas can be effectively transmitted.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting control information, performed by a base station, in a wireless communication system, the method comprising:
   generating downlink control information (DCI) for scheduling of a physical uplink shared channel;
   attaching a cyclic redundancy check (CRC) for error detection to the DCI;
   scrambling the CRC with an antenna group selection indicator indicating an antenna group comprising two or more activated transmit antennas among a plurality of transmit antennas;
   transmitting the DCI and the scrambled CRC to a user equipment (UE) using a physical downlink control channel (PDCCH); and
   receiving data, from the UE, transmitted through the transmit antennas included in the antenna group.

2. The method of claim 1, wherein the number of transmit antennas included in the antenna group indicated by the antenna group selection indicator is same to the number of power amplifiers of the UE.

3. The method of claim 2, wherein the number of the plurality of transmit antennas is larger than the number of the power amplifiers of the UE.

4. The method of claim 3, wherein the number of the plurality of transmit antennas is 4.

5. The method of claim 4, wherein the antenna group selection indicator indicates an antenna group comprising two activated transmit antennas among the 4 transmit antennas.

6. The method of claim 1, wherein the antenna group selection indicator indicates an antenna group among predetermined antenna groups.

7. A method of transmitting data, performed by a user equipment (UE), in a wireless communication system, the method comprising:
   receiving downlink control information (DCI) and a cyclic redundancy check (CRC) which is scrambled with an antenna group selection indicator indicating an antenna group comprising two or more activated transmit antennas among a plurality of transmit antennas;
   decoding the DCI;
   selecting transmit antennas to be activated according to the antenna group selection indicator; and
   transmitting data through a physical uplink shared channel (PUSCH) scheduled by the DCI,
   wherein the transmit antennas used for the transmission of the PUSCH are indicated by the antenna group selection indicator.

8. The method of claim 7, wherein the number of transmit antennas included in the antenna group indicated by the antenna group selection indicator is same to the number of power amplifiers of the UE.

9. The method of claim 8, wherein the number of the plurality of transmit antennas is larger than the number of the power amplifiers of the UE.

10. The method of claim 9, wherein the number of the plurality of transmit antennas is 4.

11. The method of claim 10, wherein the antenna group selection indicator indicates an antenna group comprising two activated transmit antennas among the 4 transmit antennas.

12. The method of claim 7, wherein the antenna group selection indicator indicates an antenna group among predetermined antenna groups.

* * * * *